(12) United States Patent
Machalek

(10) Patent No.: US 7,185,279 B2
(45) Date of Patent: Feb. 27, 2007

(54) DATA MINING AND REPORTING

(75) Inventor: Robert Machalek, St. Paul, MN (US)

(73) Assignee: Master Mine Software, Inc., Minneapolis, MN (US)

( * ) Notice: Subject to any disclaimer, the term of this patent is extended or adjusted under 35 U.S.C. 154(b) by 360 days.

(21) Appl. No.: 09/738,639

(22) Filed: Dec. 15, 2000

(65) Prior Publication Data
US 2002/0013786 A1    Jan. 31, 2002

Related U.S. Application Data

(60) Provisional application No. 60/175,025, filed on Jan. 7, 2000.

(51) Int. Cl.
G06F 17/30    (2006.01)
(52) U.S. Cl. .................. 715/522; 715/509; 715/503
(58) Field of Classification Search .............. 705/14; 345/764; 715/504, 509, 522, 514
See application file for complete search history.

(56) References Cited

U.S. PATENT DOCUMENTS 6,411,313 B1 *  6/2002  Conlon et al. ............. 345/769
6,519,571 B1 *  2/2003  Guheen et al. ............ 705/14
6,626,959 B1 *  9/2003  Moise et al. .............. 715/522
6,631,497 B1 * 10/2003  Jamshidi et al. ........... 715/514

OTHER PUBLICATIONS

Microsoft Excel 2000, screenshots and help printouts (showing PivotTable, database, OLAP, macros), copyright 1999.*
Microsoft Access 2000, screenshots and help printouts (showing PivotTable, database,spreadsheets, macros), copyright 1999.*
SalesPath Corporation http://www.salespath.com.

* cited by examiner

Primary Examiner—Heather R. Herndon
Assistant Examiner—Gautam Sain
(74) Attorney, Agent, or Firm—Shumaker & Sieffert, P.A.

(57) ABSTRACT

An integrated system is described that allows a user to easily mine and report data maintained by a customer relationship management (CRM) application. In general, the system automates the process of creating electronic reports, such as an electronic worksheet, in a format that can be directly manipulated and viewed from spreadsheet application. In one embodiment, the report is automatically generated to include a pivot table for displaying the data. The system includes a database adapted to store the CRM data. First and second reporting modules execute within the CRM software application and the worksheet software application, respectively. The reporting modules cooperate in order to integrate CRM application and spreadsheet application, thereby automating the process of generating a worksheet based on the CRM database.

19 Claims, 14 Drawing Sheets

| | A | B | C | D | E | F | G | H | I |
|---|---|---|---|---|---|---|---|---|---|
| 1 | Record_Type | OnDate | DaysTill | User_ID | Activity_Code | Short_Reference | OnWeek | Duration | Last_Modified |
| 2 | A | 1/1/2000 | -313 | ROB | TRA | Training Due | 1/1/2000 | 300 | 9/7/2000 |
| 3 | C | 3/29/2000 | -225 | ROB | | Downloaded 1/19 | 3/29/2000 | 0 | 3/28/2000 |
| 4 | C | 4/10/2000 | -213 | ROB | | FUP on request for m | 4/10/2000 | 0 | 4/7/2000 |
| 5 | C | 5/17/2000 | -176 | ROB | | FUP e-mail idea star | 5/17/2000 | 0 | 6/15/2000 |
| 6 | C | 5/19/2000 | -174 | ROB | SG | Just trying to get s | 5/19/2000 | 0 | 5/15/2000 |
| 7 | C | 8/9/2000 | -92 | ROB | | Identify Decision Ma | 8/9/2000 | 0 | 8/9/2000 |
| 8 | C | 9/9/2000 | -61 | ROB | SG | FUP to meeting - Bum | 9/9/2000 | 0 | 9/7/2000 |
| 9 | C | 9/27/2000 | -43 | ROB | SG | Still may do show sp | 9/27/2000 | 0 | 9/26/2000 |
| 10 | C | 9/27/2000 | -43 | ROB | SG | He will call me back | 9/27/2000 | 0 | 9/25/2000 |
| 11 | C | 9/27/2000 | -43 | ROB | SG | Will have a tech dow | 9/27/2000 | 0 | 9/18/2000 |
| 12 | C | 10/19/2000 | -21 | ROB | SG | Jeff is pumped and g | 10/19/2000 | 0 | 10/12/2000 |
| 13 | Q | 10/19/2000 | -21 | ROB | | Getting MasterMine r | 10/19/2000 | 0 | 10/19/2000 |
| 14 | M | 10/20/2000 | -20 | ROB | | re: Visit in Novembe | 10/20/2000 | 0 | 10/20/2000 |
| 15 | C | 10/21/2000 | -19 | ROB | SG | Jamie is juggling it | 10/21/2000 | 0 | 9/21/2000 |
| 16 | C | 10/23/2000 | -17 | ROB | SG | Don't rush him - thi | 10/23/2000 | 0 | 9/26/2000 |

FIG. 14

DATA MINING AND REPORTING

This application claims priority under 35 USC §119(e) to U.S. Provisional Patent Application Ser. No. 60/175,025, filed on Jan. 7, 2000, the entire contents of which are hereby incorporated by reference.

BACKGROUND

Conventional Customer Relationship Management (CRM) software applications are used to manage all aspects of customer relations by integrating a company's sales force, processes, sales channels and customers into one environment. For example, FrontRange Solutions™ of Colorado Springs, Colo., offers Goldmine™, which is a suite of software applications for managing sales, marketing, service and support. Most CRM applications typically include a report generation module for viewing the customer information (CRM data) using a variety of predefined or custom reports. In addition, the applications may allow the user to export the CRM data to a spreadsheet software application for more detailed analysis. For example, a user may use Microsoft Excel provided by Microsoft Corporation of Redmond, Wash. to manipulate and view the CRM data. Typically the CRM data is exported in a tab-delimited format that can be imported by the spreadsheet software application.

DESCRIPTION OF DRAWINGS

FIGS. 11 through 16 illustrate an example user interface presented by the integrated system while the user interacts with the worksheet to invoke the CRM application.

DESCRIPTION

Figure 1:
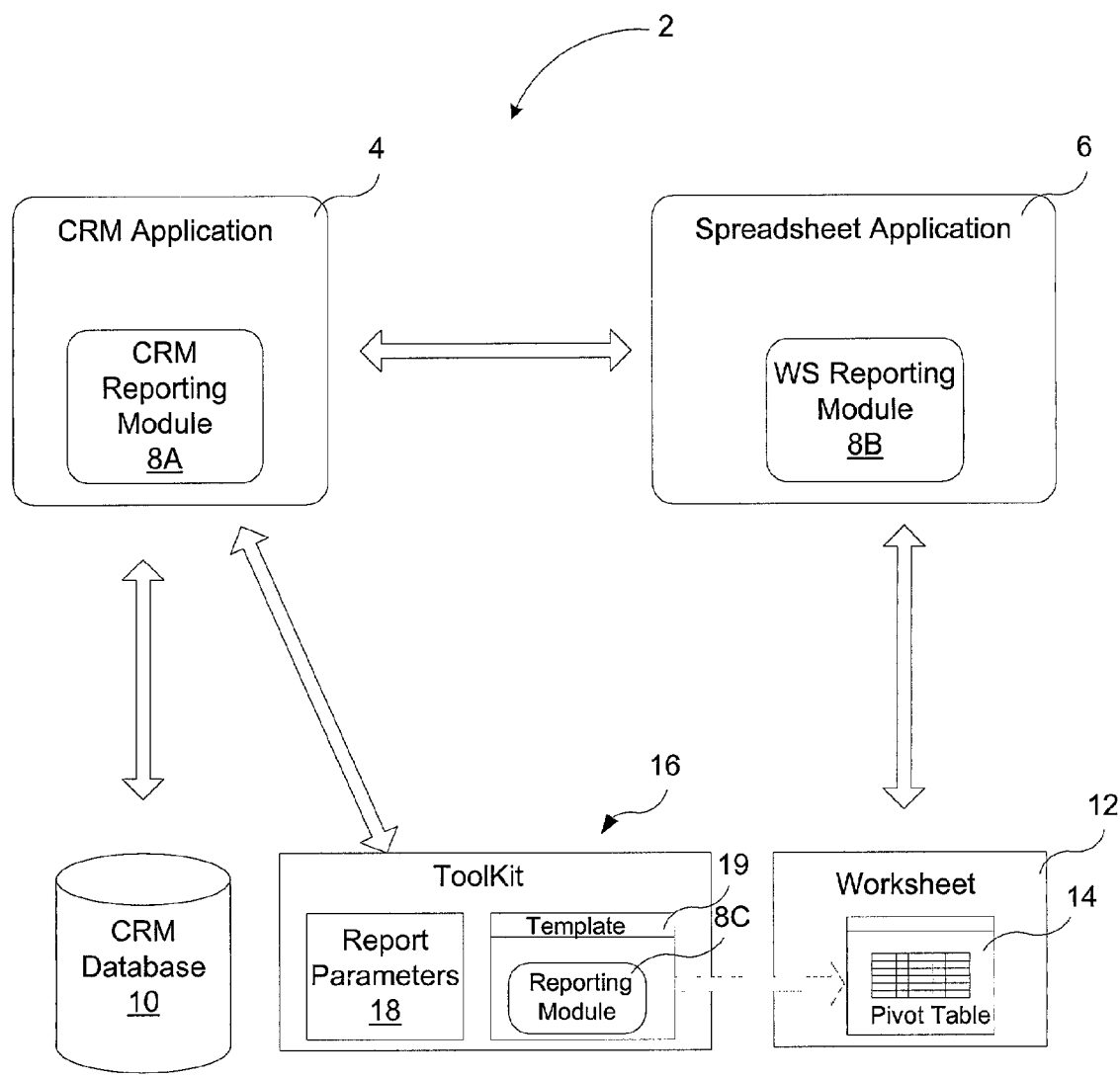
FIG. 1 is a block diagram illustrating an example system that integrates a CRM software application with a spreadsheet software application.

FIG. 1 illustrates an example system 2 for easily mining and reporting data maintained by a CRM application, such as Goldmine from FrontRange Solutions. Generally, system 2 provides an integrated environment that automates the process of creating electronic reports, such as electronic worksheet 12, in a format that can be directly manipulated and viewed from spreadsheet application 6.

CRM application 4 represents any conventional CRM environment that integrates customer-related business functions such as sales, marketing, service and support. CRM application 4 stores CRM data, such as sales and marketing information, within CRM database 10. In one configuration CRM database 10 is a relational database in which the data is organized according to a number of tables and relationships. Example of such databases include SQL Server™ and Microsoft Access™ provided by Microsoft Corporation, Oracle™ provided by Oracle™ Corporation of Redwood Shores, Calif., and dBase IV.

Spreadsheet application 6 represents any conventional spreadsheet data analysis software application such as Microsoft Excel provided by Microsoft Corporation, Quattro™ Pro of Corel and Lotus 1-2-3™ of Lotus Development Corporation. Using spreadsheet application 6, a user can view electronic worksheet 12, which may be one of a number of worksheets organized as a workbook.

Reporting modules 8 cooperate in order to integrate CRM application 4 and spreadsheet application 6, thereby automating the process of generating worksheet 12 based on CRM database 10. In particular, reporting modules 8 automatically generate multi-dimensional analysis table 14 within electronic worksheet 12 according to the CRM data within CRM database 10. Multi-dimensional analysis table 14 represents an analytical function, commonly referred to as a pivot table or as a "cross-tab", supported by a variety of spreadsheet environments for displaying large amounts of data. Table 14 allows the user to quickly and easily summarizes or view large amounts of CRM data. For example, the user can rotate the rows and columns of table 14 to see different summaries of the CRM data, filter the data by displaying different pages, or display the details for area of interest.

As discussed in detail below, CRM reporting module 8A is "installed" within CRM application 4 and, when invoked by the user, examines the schema and data structures of CRM database 10, as well as customized settings like local field names within CRM application 4. Reporting module 8A then interacts with reporting module 8B installed within spreadsheet application 6 and reporting module 8C of worksheet 12 to create table 14 within worksheet 12. In this manner, the user can create a comprehensive multi-dimensional analysis table 14 by only entering a few parameters, thereby significantly reducing the skill normally required to generate multi-dimensional analysis tables. Reporting modules 8A and 8B may be executable files invoked by CRM application 4 or spreadsheet application 6 or, for example, may be "plug-in" modules executed by the respective applications.

System 2 includes one or more report toolkits 16 that include pre-defined report parameters 18 and one or more worksheet templates 19. Worksheet template 19 includes reporting component 8C for formatting table 14 once created, as described below.

CRM reporting module 8A may use an interprocess communication mechanism, or other suitable method, to communicate the parameters to worksheet application 6 and to invoke report modules 8B and 8C for formatting worksheet 12. For example, in one configuration reporting modules 8B and 8C are Visual Basic Application scripts that are directly callable by reporting component 8A. In this configuration reporting component 8A can comprise an executable program written in the Visual Basic language. Alternatively, other suitable means include Dynamic Data Exchange (DDE), Object Linking and Embedding (OLE), or Component Object Model (COM), which are interprocess communication mechanisms supported by various operating systems and allow applications to share data.

The availability of table 14, and its supported functions, vastly improves the user's ability to analyze the CRM data stored within CRM database 10. After table 14 is generated, the user can interact with spreadsheet application 6 to manipulate table 14 in order to analyze the captured CRM data and "mine" the data for important insights. Further-more, after viewing the CRM data within the format of table 14, the user can select any amount of the CRM data and automatically invoke CRM application 4 to view the corresponding transactional records, such as a record of a sales call.

Figure 2:
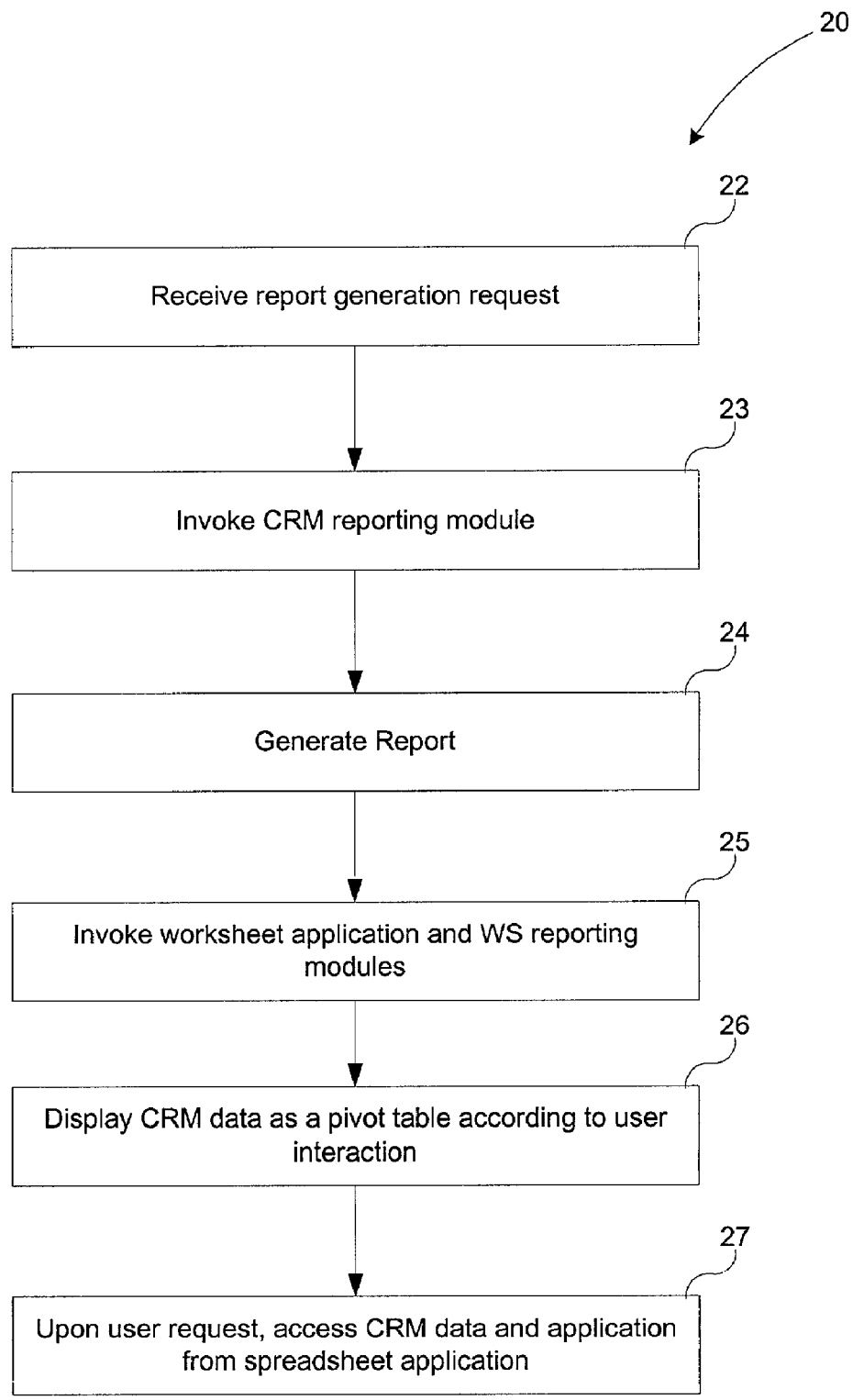
FIG. 2 is a flow chart illustrating example user interaction with the integrated system.

FIG. 2 is a flowchart illustrating example user interaction with integrated system 2. More specifically, process 20 illustrates user interaction with CRM application 4 to automatically generate an electronic report, such as worksheet 12 and table 14, and further user interaction with the spreadsheet application 6 and electronic report to manipulate CRM data and display CRM records within CRM application 4.

First, the user interacts with CRM application 4 and requests the generation of electronic worksheet 12 and table 14 (22). In response to the request, CRM application 4 invokes CRM reporting module 8A for interacting with the user to capture a number of report generation parameters and reporting module 8B loaded within spreadsheet application 6 (23).

Next, as described in detail below, reporting module 8A constructs table 14 within worksheet 12, conforming to the format of spreadsheet application 6 and according to user-entered parameters combined with pre-defined report parameters 18 in toolkit 16 (24). In particular, reporting module 8A uses captured user parameters to specify toolkit 16, and within toolkit 16, to specify predefined report parameters 18 and worksheet template 19. Reporting module 8A then invokes spreadsheet application 6 and directs it to create worksheet 12 as a copy of worksheet template 19, containing worksheet reporting module 8C. Reporting module 8A then generates table 14 within worksheet 12 according to report parameters 18 and the captured user parameters.

After generating table 14, reporting module 8A invokes and cooperates with reporting modules 8B and 8C to format and organize table 14 (25). For example, reporting module 8A invokes and communicates the parameters to 8B and 8C for further formatting and organization of table 14. In one configuration, additional formatting procedures in reporting module 8C are invoked by spreadsheet application 6 the first time worksheet 12 is accessed.

After reporting module 8B generates electronic worksheet 12, spreadsheet application 6 displays the CRM data as table 14 that can easily be manipulated by the user (26). In addition, worksheet 12 may contain a number of scripts that, in conjunction with reporting module 8B, enhance the functionality associated with table 14.

After analyzing the data within table 14, the user can select one or more entries within table 14 and request to view the underlying CRM data. The user may specify certain records within the underlying data thus displayed for further analysis. In response reporting module 8B interacts with CRM application 4 to display the corresponding CRM records within CRM application 4 (27). In this manner, system 2 provides an integrated environment that automates the process of creating electronic reports and viewing the corresponding CRM records.

Figure 3:
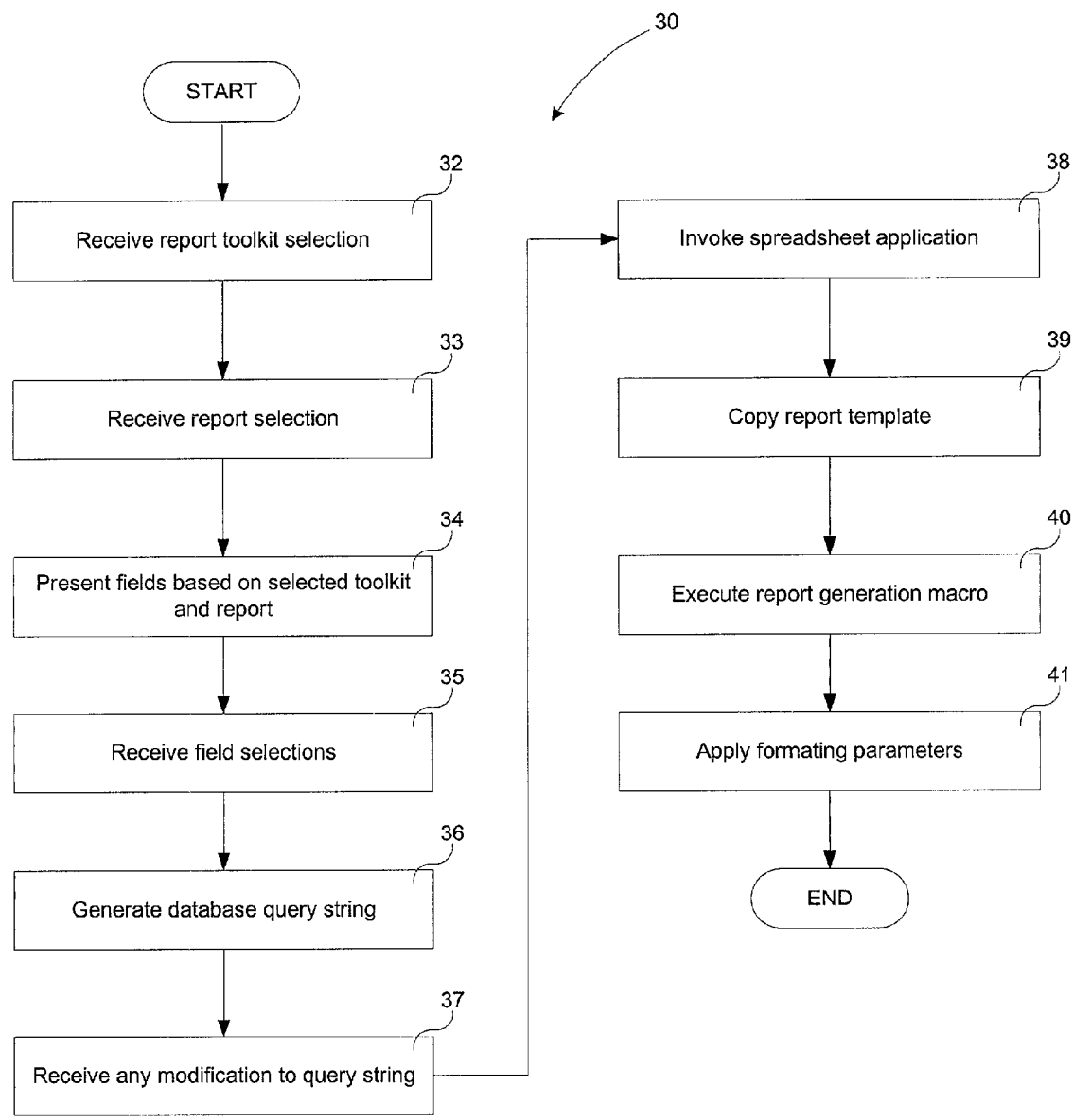
FIG. 3 is a flowchart illustrating an example process in which the integrated system automatically generates a worksheet containing CRM data.

FIG. 3 is a flowchart illustrating in further detail the process of automatically generating an electronic worksheet having a multi-dimensional analysis table from within CRM application 4. In particular process 30 illustrates the steps involved in automatically invoking spreadsheet application 6 and generating electronic worksheet 12 having table 14.

Upon receiving a request to generate an electronic worksheet in pivot table format, CRM application 4 invokes reporting module 8A for capturing a number of parameters from the user. Initially, the user selects one of a number of report sets that includes a number of predefined reports. For example, report sets may include a database manager's toolkit, a salesperson's toolkit, a sales manager toolkit and a CFO toolkit (32). Upon selecting a toolkit, the user selects one of a number of predefined reports within the toolkit (33). Based on the selected report, recording module 8A analyzes the CRM database 10 and, based on the schema for database 10, identifies a number of tables and corresponding fields for inclusion in table 14.

Reporting module 8A presents the identified fields to the user (34) and allows the user to include or exclude individual fields from the report (35). In addition, reporting module 8A allows the user to specify a level of detail such as, for example, level 1 to level 3, indicating the amount and type of data fields that he or she wishes to include in the report, taking hardware and speed limitations into account.

Upon receiving the field selections from a user (35), reporting module 8A generates a suitable database query string for capturing the appropriate CRM data from CRM database 10 (36). Reporting module 8A then presents the database query string to the user and allows the user to modify the query string as appropriate (37).

In one configuration reporting module 8A allows the user to set a number of preferences and parameters to control the process of report and field selection. For example, the user may enable or disable a number of toolkits, elect to default to an expert mode for access to advance report definition functions, specify a default start date for the inclusion of historical data and specify a default path to store the resulting electronic reports.

After capturing the parameters from the user, as described above, reporting module 8A directs spreadsheet application 6 (38) to access and copy stored worksheet template 19 in toolkit 16 according to the particular report specified by the user, thus creating worksheet 12 in the newly created workbook (39).

Reporting module 8A then creates table 14 within worksheet 12 by calling a function supported by spreadsheet application 6, which accesses CRM database 10 according to the received database query string (40). The following illustrates example syntax for a Visual Basic command to create a pivot table within an Excel worksheet in a SQL environment:

```
gExcel.ActiveSheet.PivotTableWizard_
    SourceType:=xlExternal,_
    SourceData:=Array(selArray(0), selArray(1),_
                     selArray(2), selArray(3),_
                     selArray(4), selArray(5),_
                     selArray(6), selArray(7),_
                     selArray(8), selArray(9)_
```

```
        ), _
    TableDestination:="R1C1:R10C1", _
    TableName:="PT" + LTrim(Str(sheetRow)), _
    BackgroundQuery:=False, _
    Connection:="ODBC;DRIVER=SQL Server;SERVER=" & gmSQLServer & ";
        UID=" & gmSQLUsername & ";PWD=" & gmSQLPassword & ";WSID=" &
        Trim(Str(Int(Timer()))) & ";DATABASE=" & gmSQLDatabase
```

The following illustrates example syntax for a Visual Basic command to create a pivot table within an Excel worksheet in a dBase IV environment:

```
gExcel.ActiveSheet.PivotTableWizard _
    SourceType:=xlExternal, _
    SourceData:=Array(selArray(0), selArray(1), selArray(2), _
                    selArray(3), selArray(4), selArray(5), _
                    selArray(6), selArray(7), _
                    selArray(8), selArray(9) _
    ), _
    TableDestination:="R1C1:R10C1", _
    TableName:="PT" + LTrim(Str(sheetRow)), _
    BackgroundQuery:=False, _
    Connection:=Array( _
        Array ("ODBC;CollatingSequence=ASCII;DBQ=" & defaultPath &
            ";DefaultDir=" & defaultPath), _
        Array ("Deleted=1;Driver={Microsoft dBase Driver
            *.dbf)};DriverId=277;FIL=dBase III;ImplicitCo"), _
        Array ("mmitSync=Yes;MaxBufferSize=2048;
            MaxScanRows=8;PageTimeout=600;SafeTransactions=0;
            Statistics=0;Threads=3;UserCommitSync=Yes;") _
    )
```

After reporting module 8A creates table 14 within worksheet 12, reporting module 8B applies the formatting parameters specified by the toolkit selected by the user in order to format the electronic worksheet 12 (41).

Figure 4:
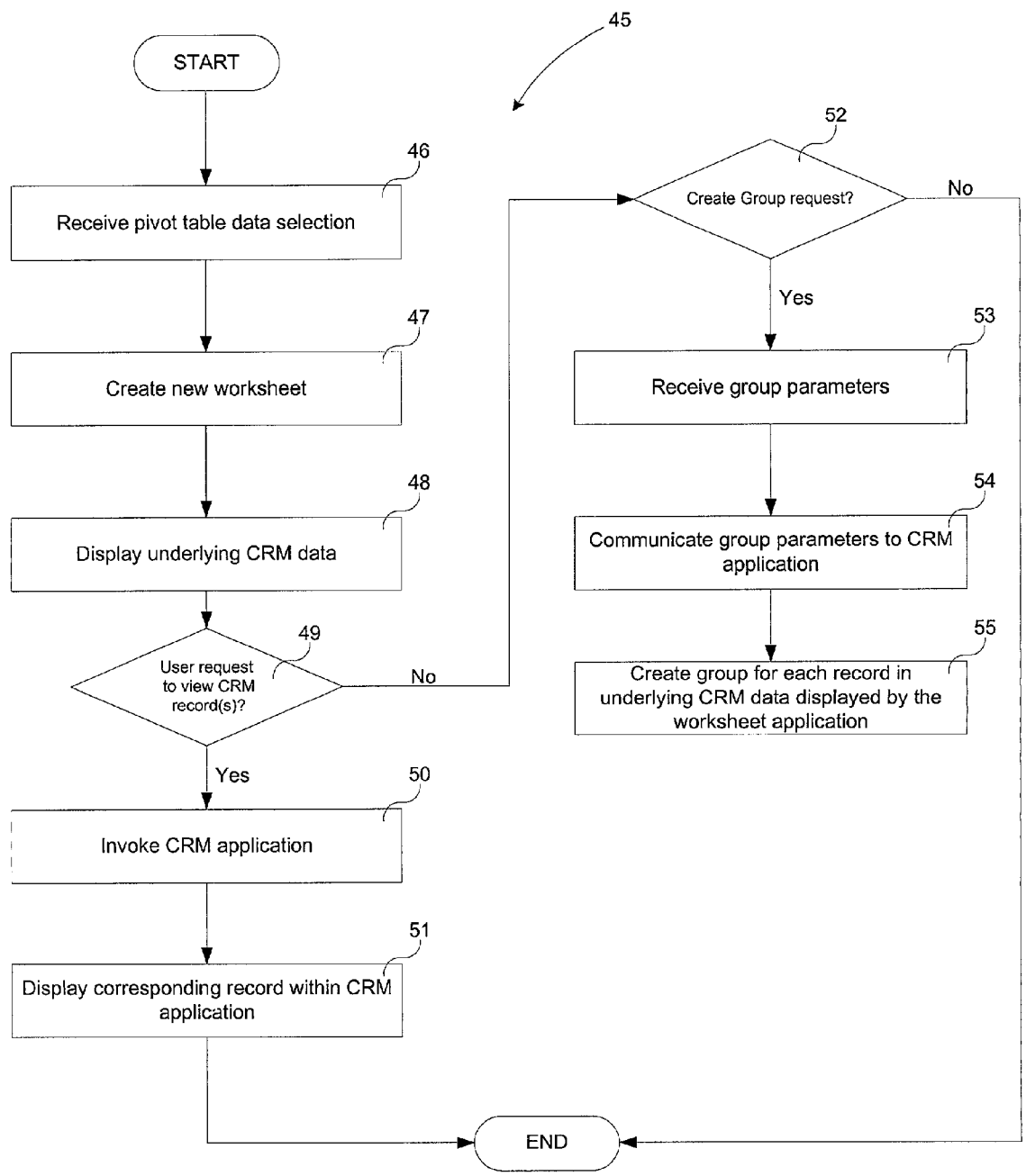
FIG. 4 is a flowchart illustrating example user interaction with the generated worksheet to invoke the CRM software application.

FIG. 4 is a flowchart illustrating in further detail the process in which the user interacts with electronic worksheet 12 and table 14. In particular, after viewing and analyzing the CRM data contained within table 14, the user is able to select a data area within table 14 and direct spreadsheet application 6 to display the selected data in further detail (46). In response, spreadsheet application 6 creates a new worksheet (47) and display the underlying CRM data contained within CRM database 10 as a columnar list of fields, where each row represents a single CRM record (48).

Reporting modules 8 support two mechanisms for linking data within table 14 directly to CRM functions: (1) the ability drill-down to individual records within CRM application 4, and (2) the ability to create CRM groups. For example, within the newly displayed worksheet, the user can double click on a single record (49) causing reporting module 8B to invoke CRM application 4 (50) to display the corresponding record within CRM application 4. In one configuration reporting utility 8B includes an embedded macro that issues commands to CRM application 4, via an interprocess control mechanism such as DDE, COM or OLE. In response, CRM application 4 determines the corresponding CRM account number associated with the selected row within the spreadsheet application 6 and displays the corresponding CRM record (51).

Alternatively, from within worksheet application 6, the user can elect to create a group within the CRM database 10 (52). In order to specify a group within CRM database 10, reporting module 8B captures a number of group parameters from within spreadsheet application 6 (53). For example, the user can specify a name for the new group. Reporting module 8B communicates the group parameters to CRM application 4 (54) that, in response, creates a group containing every record, or a user-specified selection of such records, in the underlying CRM data displayed by the worksheet application 6 (55). In one configuration reporting utility 8B issues commands to CRM application 4 via an interprocess control mechanism such as DDE, COM or OLE to create the group.

Figure 5:
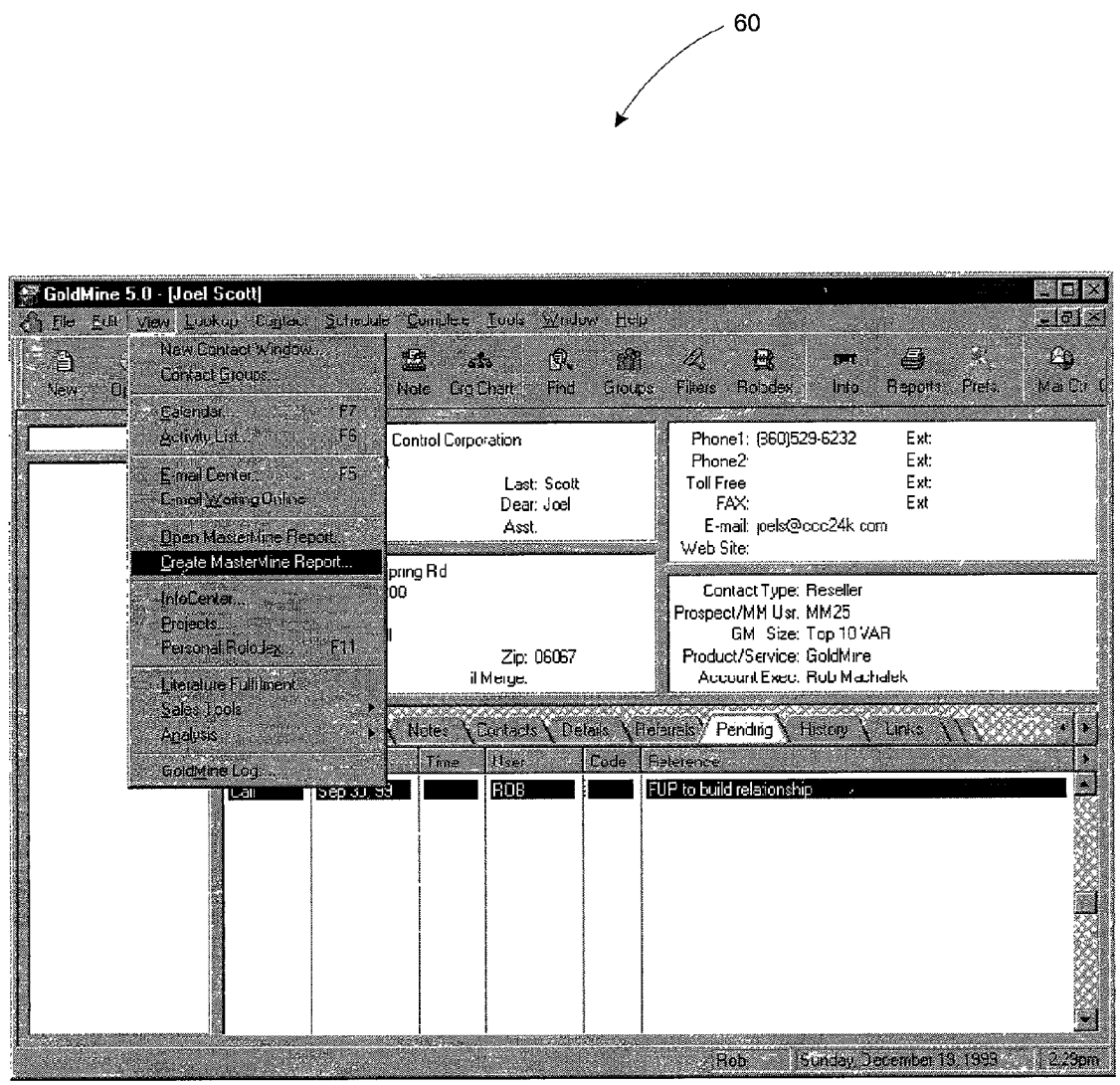
FIGS. 5 through 9 illustrate an example user interface presented by the integrated system while generating the worksheet.

FIG. 5 illustrates an example user interface provided by CRM application 4 for invoking CRM reporting module 8A in order to open an existing report or to create a new report, such as worksheet 12 containing a table 14. If the user elects to open an existing report, CRM reporting module 8A displays a typical file window in which the user can select a report. Upon selecting the report, CRM reporting component 8A invokes spreadsheet application 6 and directs spreadsheet application 6 to display the report.

Figure 6:
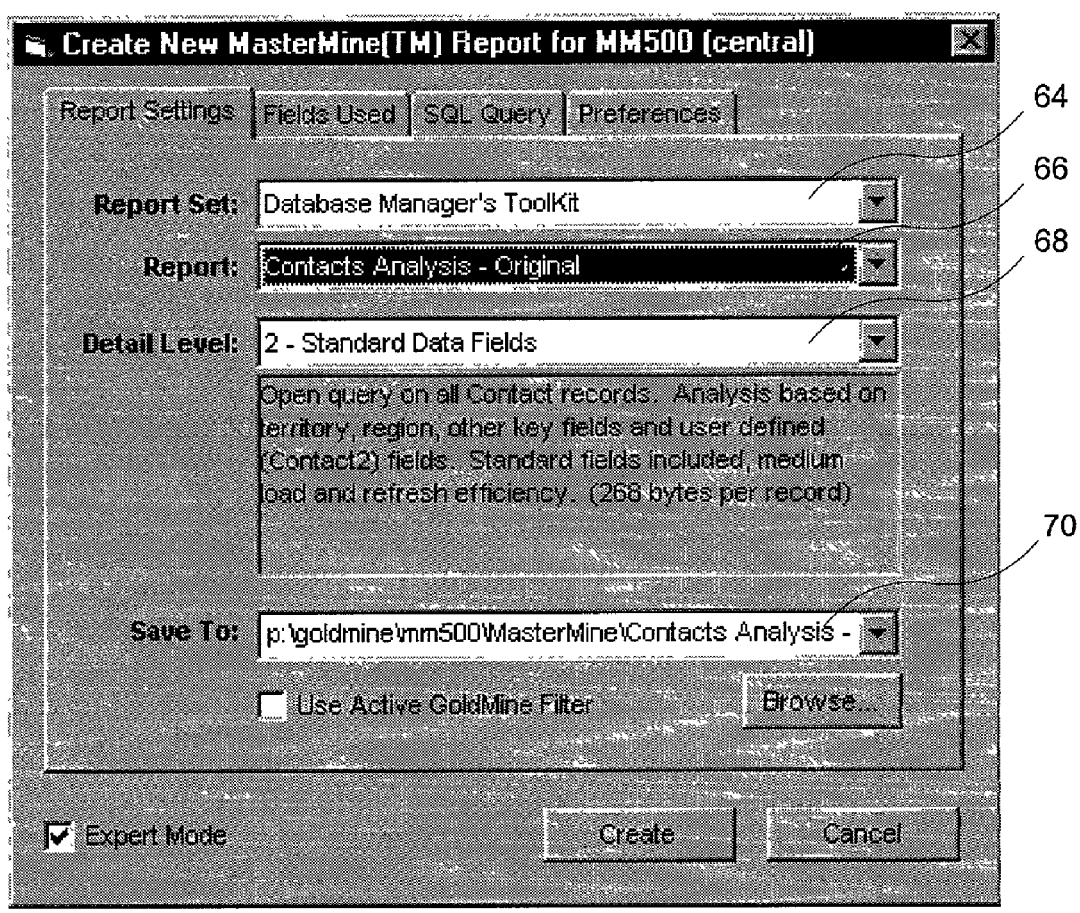

FIG. 6 illustrates an example user interface 62 presented by CRM reporting module 8A for capturing parameters from the user when the user elects to create a new report. User interface 62 includes a report set input area 64 in which the user specifies a report toolkit, a report input area 66, where the user selects one of the reports of the selected toolkit, a detail level input area 68 where the user selects a level of detail for the report, and a destination input area 70 in which the user defines a location to store the generated report.

Figure 7:
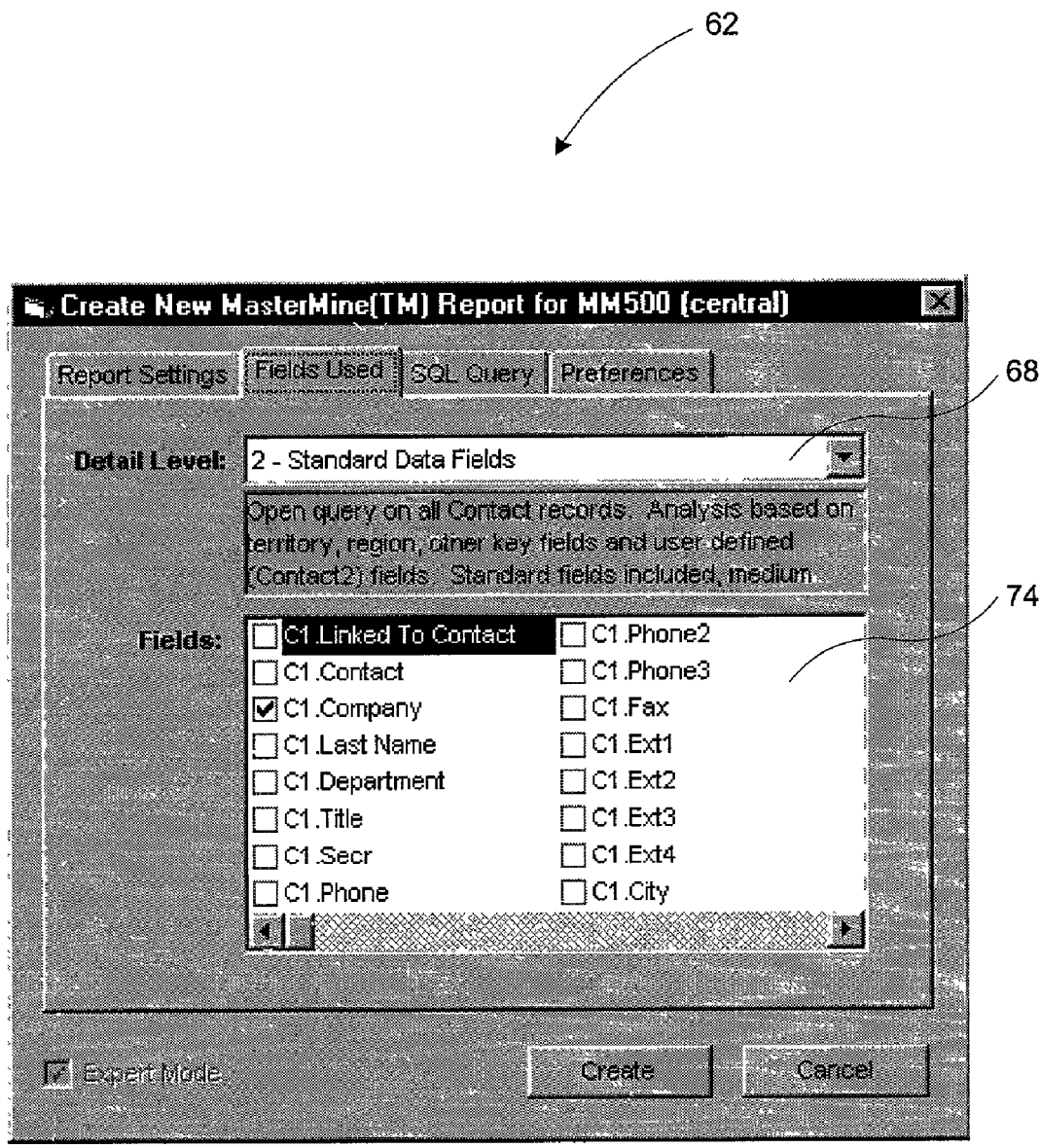
Figure 8:
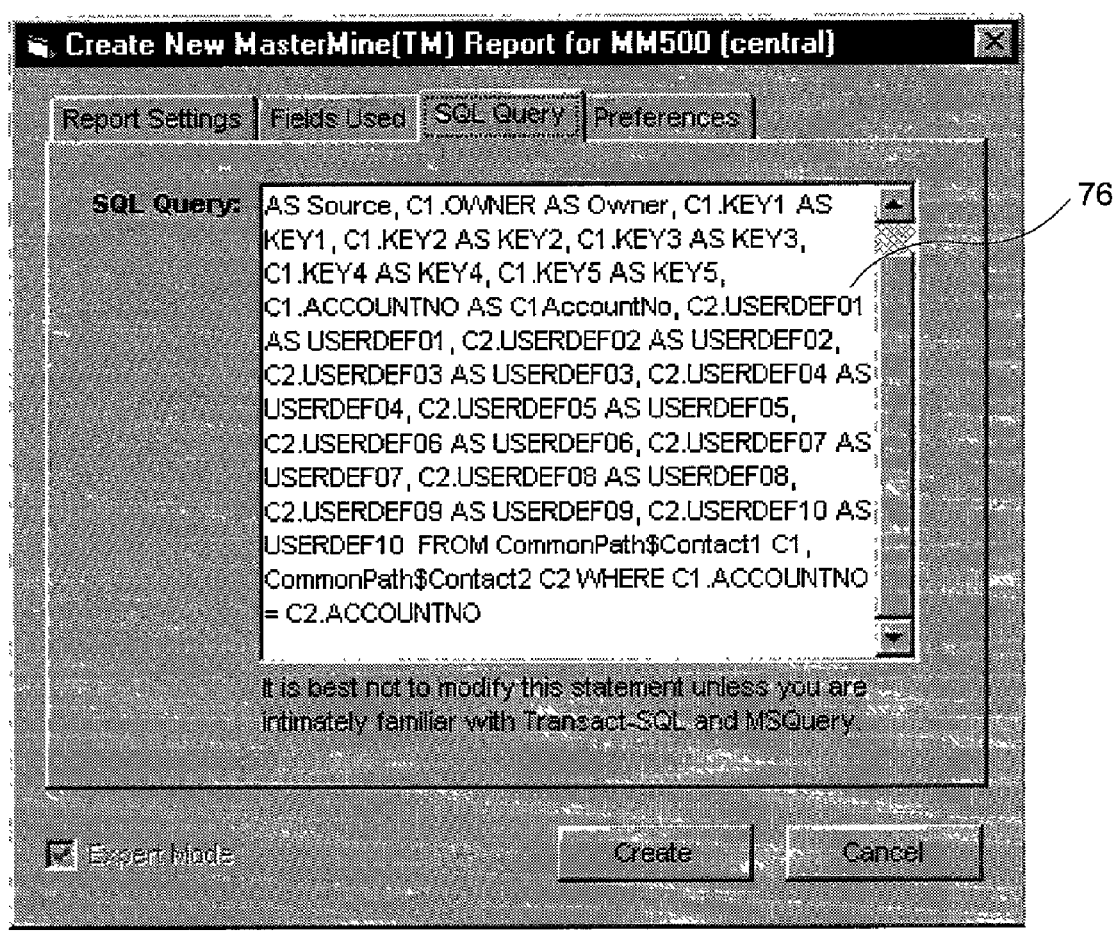

FIG. 7 further illustrates the example user interface 62. Based on the level of detail selected by the user within detail level input area 68, the user can enable or disable individual fields of the CRM database 10 by selecting or deselecting the field within field input area 74. FIG. 8 illustrates the example user interface 62 having a database query input area 76 in which the user can modify the database query string generated by CRM reporting module 8A according to the fields specified within the field selection input area 74.

Figure 9:
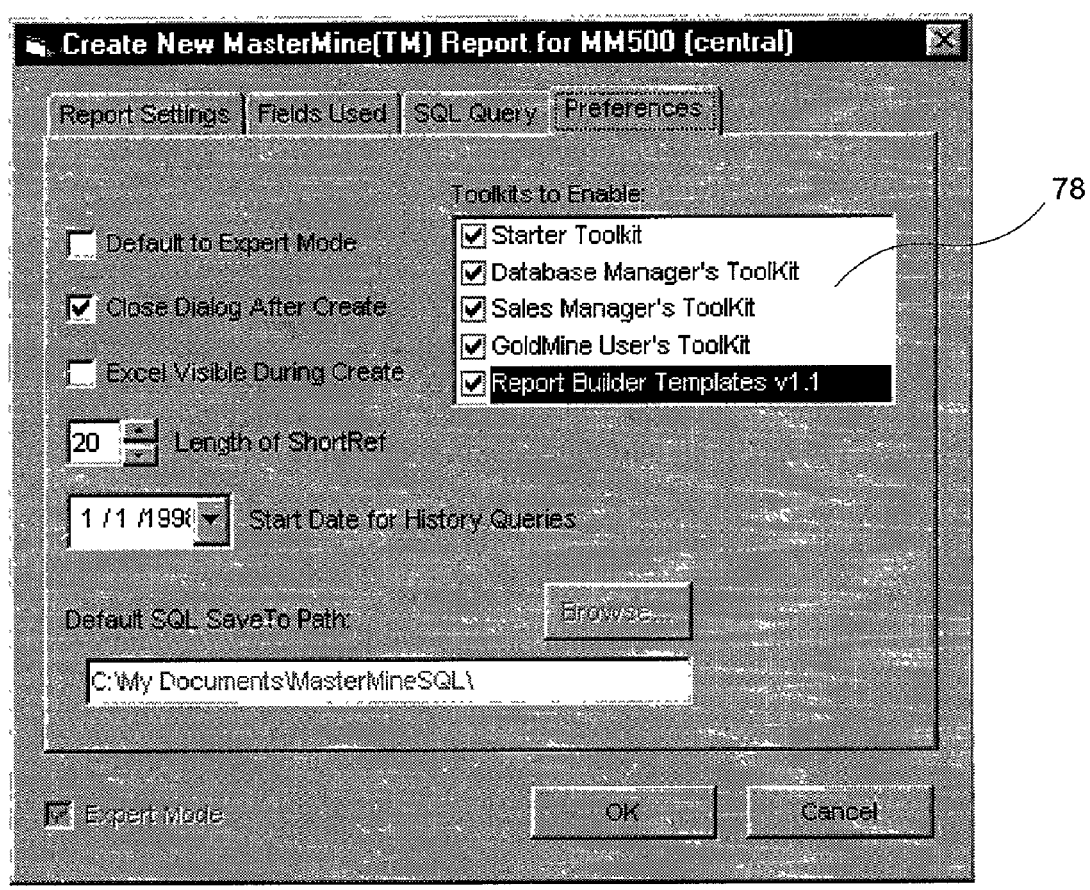

FIG. 9 illustrates the example user interface 62 having a number of input areas by which user can set one or more preferences for controlling the generation of the electronic report. For example, interface 62 presents navigate toolkit selection area 78, in which the user can enable or disable specific toolkits, and a number of other input areas for configuring CRM reporting module 8A.

Figure 10:
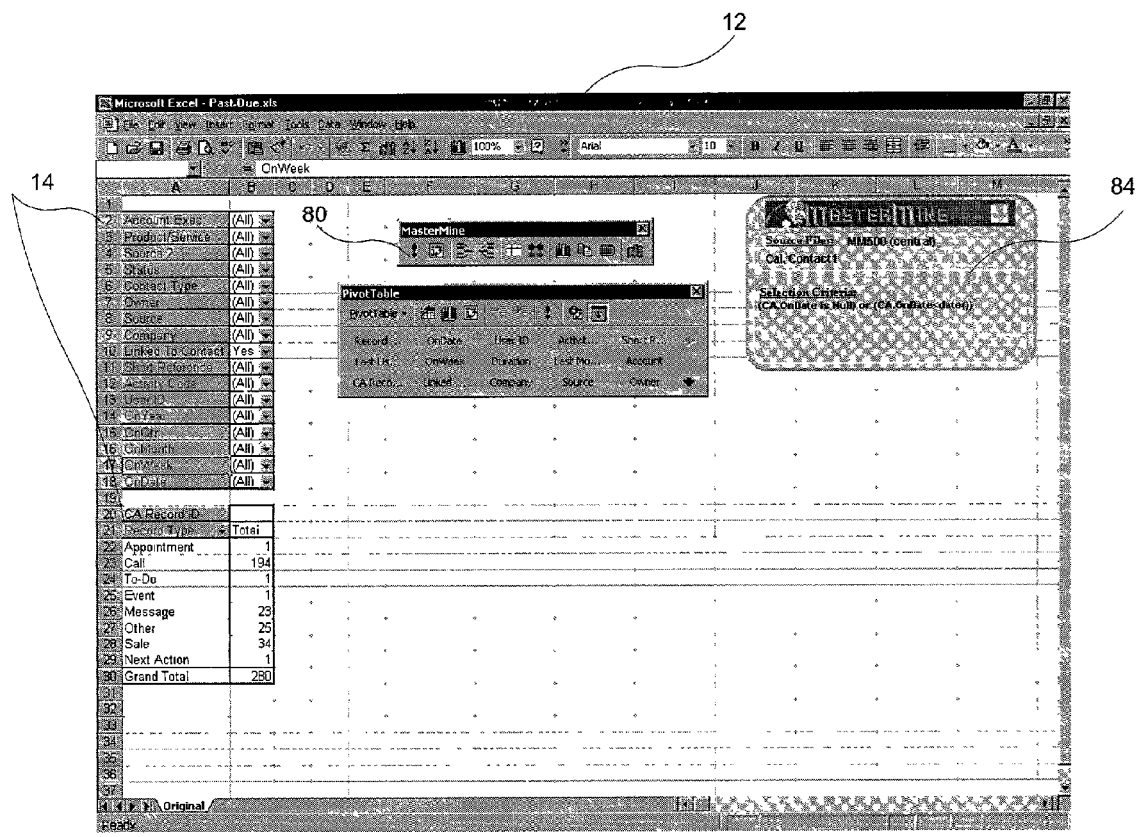
FIG. 10 illustrates an example worksheet automatically generated by the integrated system.

FIG. 10 illustrates an example worksheet 12, including table 14, that has been automatically generated by reporting modules 8. Also illustrated are a number of improvements and enhancements provided by reporting module 8B. These features specifically enhance the interoperability of CRM generated reports 12 based on the data structures of CRM database 10. For example, display box 84 displays the particular data sources and query criteria for the underlying data of table 14. In addition, CRM toolbar 80 provides many functions that are associated with CRM application 4.

Figure 11:
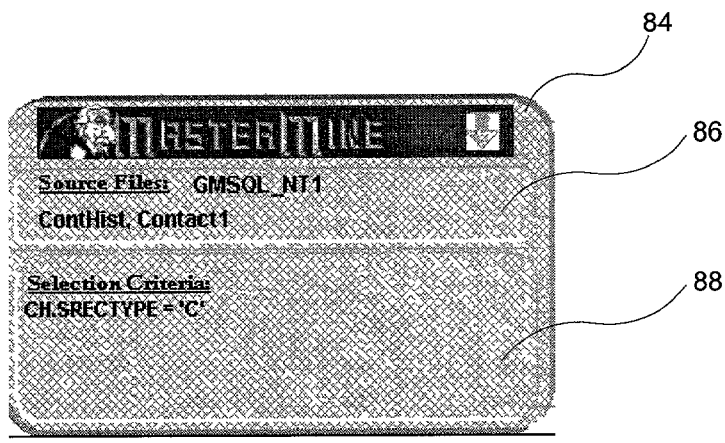
Figure 12:
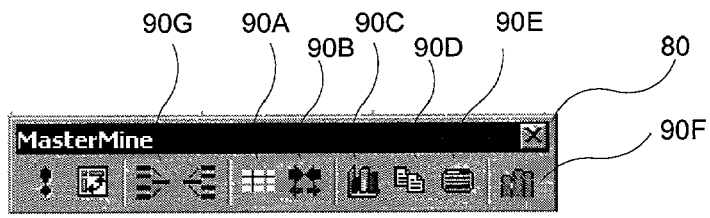

FIG. 11 illustrates an example display window 84 in which a first display area 86 lists the various source files used in generating electronic worksheet 12 and a second display area 88 that displays the selection criteria for filtering the CRM data. FIG. 12 illustrates an example of CRM toolbar 80. The illustrated toolbar includes a number of input icons 90 for selecting and performing various operations on table 14. For example, a first icon 90A freezes the panes of table 14 such that the top row and column of the table 14 are the boundaries. If there are multiple pivot tables within the current worksheet of worksheet 12 and none is selected, reporting module 8B prompts the user to select one of the available pivot tables. A second icon 90B automatically resets the column width of the selected pivot table to optimize columnar display of all data on the table. A third icon 90C invokes the inherent charting functions supported by spreadsheet application 6 for all data and innermost row and column labels for the selected pivot table. This function automatically excludes grand totals. The user can further customize the chart by using the standard technique supported by spreadsheet application 6. The fourth icon 90D automatically creates a duplicate of the current worksheet at the end of the tab row on the current workbook. The fifth icon 90E displays or hides display box 84. The sixth icon 90F automatically creates a CRM group from all of the rows listed in the current worksheet, as described in detail above. The seventh icon 90G provides enhanced grouping abilities within Excel, as illustrated in FIG. 13.

Figure 13:
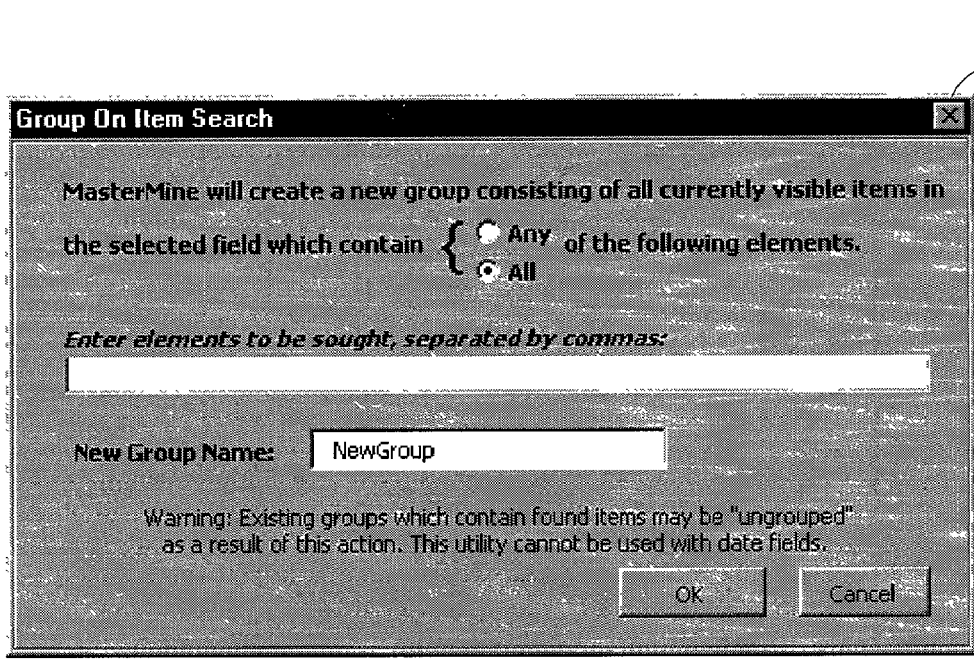

FIG. 13 illustrates an example user interface presented by reporting module 8B that enhances the searching and grouping abilities of worksheet application 6. Grouping window 82 allows the user to specify one or more elements to search for among the currently visible items displayed by table 14 and whether the group should be generated to consist of those items that contain all of the specified elements or any of the specified elements. In addition, the user can enter a name for the new group to be created. This interface replaces the often laborious hand-selection of to-be-grouped items supported by conventional worksheet applications.

Figure 15:
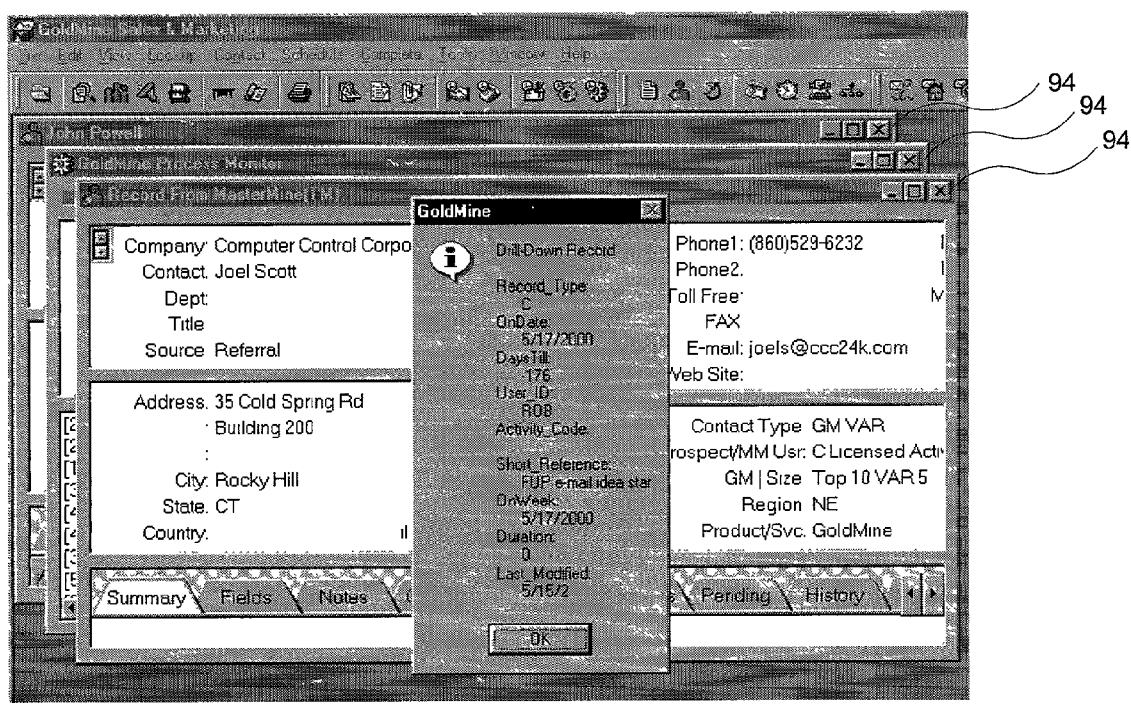

FIGS. 14 and 15 illustrate two mechanisms for linking to the table 14 directly to functions supported by CRM application 4: (1) the ability to drill into individual records and (2) the ability to create specific groups within CRM database 10. Specifically, FIG. 14 illustrates a new worksheet 92 that is generated and displayed when the user double clicks on any cell in the data area of table 14. Newly created worksheet 92 displays the underlying data for the records in the selected cell. As illustrated in FIG. 14, the data is displayed in the columnar format, with each row representing one CRM record. Reporting module 8B adds the capability of drilling down into the records in order to view the CRM records via CRM application 4. When the user double clicks anywhere on a given row within the worksheet 92, CRM application 4 is automatically invoked and the record represented by the selected row is retrieved and displayed, as illustrated in FIG. 15. The records 94 may then be updated or otherwise manipulated by the user as normal within CRM application 4.

Figure 16:
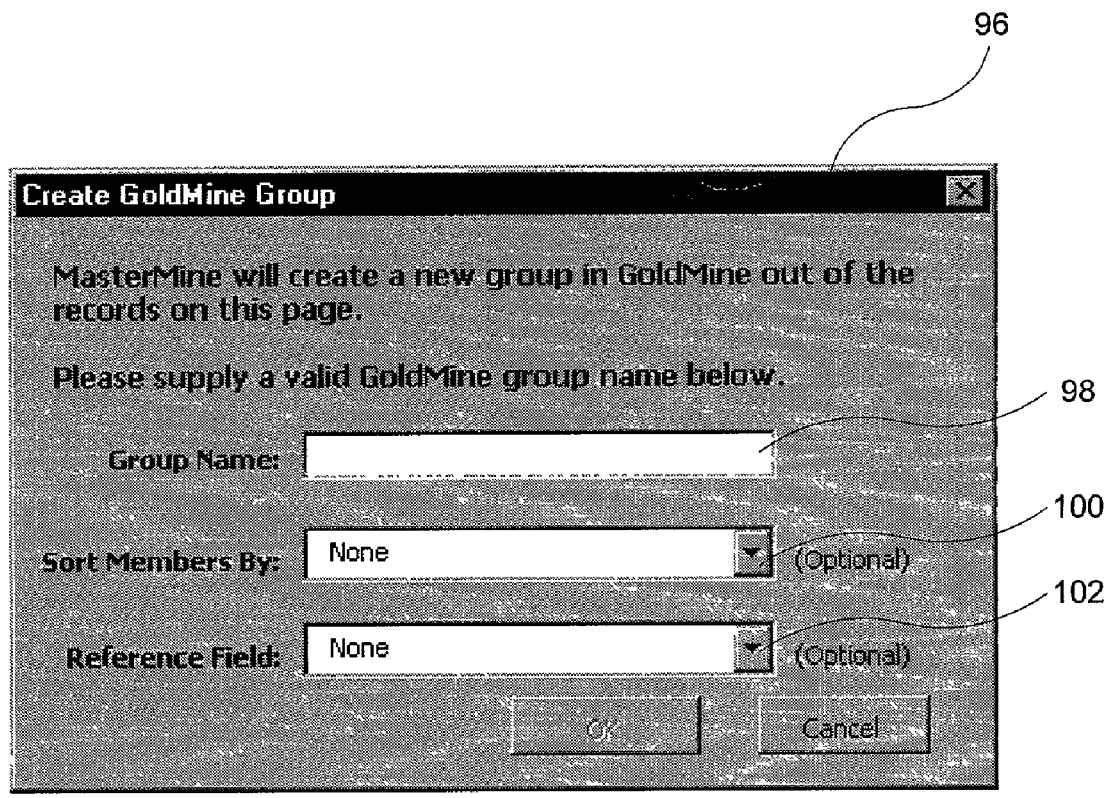

FIG. 16 illustrates an example user interface displayed by reporting module 8B when the user selects icon 90F from pivot table toolbar 80 in order to create CRM groups within CRM database 10. Grouping window 96 includes a group name input area 98 in which the user specifies the name for the group to be created. In addition, group window 96 includes a sort criteria input area 100 in which the user specifies the members of the group on which to sort. Reference field input area 102 allows the user to specify a field for which to use as a reference for the group.

Various embodiments of the invention have been described. These and other embodiments are within the scope of the following claims.

What is claimed is:

1. A method comprising:
    receiving a report generation request within a customer relationship management (CRM) software application;
    in response to the request, invoking a spreadsheet application from the CRM software application using an application programming interface (API) to automatically generate an electronic worksheet viewable by the spreadsheet software application;
    invoking the spreadsheet application from the CRM software application using the API to automatically generate a pivot table within the electronic worksheet;
    presenting the pivot table to a user with the spreadsheet application;
    receiving within the spreadsheet application a user selection of the CRM data within the pivot table;
    in response to the selection, automatically creating a worksheet that displays the CRM data as a number of rows in columnar format according to fields within the CRM database, wherein each row represents a single CRM record stored within the CRM database;
    receiving within the spreadsheet application a selection of one or more of the rows from the user; and
    in response to the selection, automatically invoking the CRM software application from the spreadsheet application to display the corresponding CRM records of the selected rows.

2. The method of claim 1, wherein generating the worksheet comprises communicating report parameters from the CRM software application to the spreadsheet software application.

3. The method of claim 2 further comprising:
    receiving a selection of one of a plurality of report toolkits;
    displaying a list of report templates based on the selected report toolkit;
    receiving a selection of one of the report templates;
    creating a new workbook; and
    copying the selected report template into the workbook as a new worksheet.

4. The method of claim 3, further comprising presenting a set of user-selectable database fields as a function of the selected report template.

5. The method of claim 1, further comprising:
generating a database query as a function of database fields selected by a user; and
directing the spreadsheet software application to generate the pivot table according to the database query.

6. The method of claim 1, wherein generating the electronic spreadsheet comprises executing one or more macros within the spreadsheet software application to format the pivot table.

7. The method of claim 6, wherein executing the macro includes formatting the electronic worksheet according to a report template selected by the CRM software application.

8. The method of claim 1 further comprising:
receiving user input specifying one or more elements to search for among the data of the pivot table; and
creating a group within the pivot table according to the user input.

9. The method of claim 1, further comprising:
receiving within the spreadsheet application and by interaction of a user with the pivot table, a user request to create a group within the CRM software application; and
in response to the user request, automatically invoking functions within the CRM software application from the worksheet software application to create a group consisting of CRM records within the CRM database.

10. The method of claim 9 further comprising:
receiving group parameters within the spreadsheet software application; and
communicating the group parameters to the CRM application.

11. A system comprising:
a database adapted to store customer relationship management (CRM) records containing CRM data; and
a programmable processor adapted to execute a CRM software application having a reporting module and a spreadsheet software application having a reporting module,
wherein the reporting module of the CRM software application is adapted to invoke the reporting module of the spreadsheet software application to automatically generate a pivot table within an electronic worksheet viewable by the spreadsheet software application based on the CRM data,
wherein the reporting module of the spreadsheet application displays the pivot table and receives a user selection of one or more cells of the pivot table,
wherein, in response to the user selection of the one or more cells within the pivot table, the spreadsheet software application automatically communicates with the reporting module of the CRM software application to access the CRM records associated with the selected cells of the pivot table and create a worksheet that displays the CRM data as a number of rows according to fields within the CRM database,
wherein, in response to a selection of one or more of the rows within the new worksheet, the spreadsheet software application automatically invokes the CRM software application to display the associated CRM records.

12. The system of claim 11 further comprising a plurality of report toolkits, each report toolkit defining one or more report templates.

13. The system of claim 12, wherein the report module of the CRM software application includes a user interface to receive a selection of one of the report templates and to present a set of user-selectable database fields as a function of the selected report template.

14. The system of claim 13, wherein the reporting module of the CRM software application is adapted to generate a database query as a function of the database fields selected by the user and to communicate the database query to the spreadsheet software application, and wherein, in response, the reporting module of the spreadsheet application issues the query to the database to retrieve the CRM records and automatically create the pivot table.

15. The system of claim 11, wherein the reporting module of the spreadsheet software application is adapted to receive user input specifying one or more elements to search for among the data of the pivot table and to direct the spreadsheet software application to create a group within the pivot table according to the user input.

16. The system of claim 11, wherein the generated electronic spreadsheet includes formatting information to format the electronic worksheet according to the selected report template.

17. An article comprising a medium having computer-executable instructions of a first reporting module and a second reporting module contained therein, wherein the first and second reporting modules are adapted for execution within a customer relationship management (CRM) software application and a spreadsheet software application, respectively, and further wherein the executable instructions cause a programmable processor to:
receive a report generation request within a customer relationship management (CRM) software application; and
in response to the request, invoke the reporting module of the spreadsheet application from the reporting module of the CRM software application using an application programming interface (API) to automatically generate an electronic worksheet viewable by the spreadsheet software application;
invoke the reporting module of the spreadsheet application from the reporting module of the CRM software application using the API to automatically generate a pivot table within the electronic worksheet;
presenting the pivot table to a user with the reporting module of the spreadsheet application;
receiving with the reporting module of the spreadsheet application a user selection of the CRM data within the pivot table;
in response to the selection, automatically create a worksheet that displays the CRM data as a number of rows in columnar format according to fields within the CRM database, wherein each row represents a single CRM record stored within the CRM database;
receive within the reporting module of the spreadsheet application a selection of one or more of the rows from the user; and
in response to the selection, automatically invoke the CRM software application from the spreadsheet application to display the corresponding CRM records of the selected rows.

18. The article of claim 17, wherein executable instructions cause the first reporting module to communicate report parameters from the CRM software application to the spreadsheet software application.

19. The article of claim 17, wherein executable instructions cause the first reporting module to:
receive a selection of one of a plurality of report toolkits;

display a list of report templates based on the selected report toolkit;
receive a selection of one of the report templates; and
create a new workbook; and
copy the selected report template into the workbook as a new worksheet.

* * * * *